(12) United States Patent
Schmeichel

(10) Patent No.: US 7,147,265 B1
(45) Date of Patent: Dec. 12, 2006

(54) COLLAPSIBLE TRUCK BED COVER

(75) Inventor: Jay A. Schmeichel, Bismarck, ND (US)

(73) Assignee: Bismarck Canvas, Inc., Bismarck, ND (US)

( * ) Notice: Subject to any disclaimer, the term of this patent is extended or adjusted under 35 U.S.C. 154(b) by 0 days.

(21) Appl. No.: 11/295,947

(22) Filed: Dec. 7, 2005

(51) Int. Cl.
 B60P 7/02 (2006.01)
 B60J 7/12 (2006.01)

(52) U.S. Cl. .............. 296/100.14; 296/26.07; 296/100.17; 296/100.18; 296/107.09; 296/122

(58) Field of Classification Search .......... 296/108, 296/26.06, 26.07, 100.18, 165, 100.14; 135/88.09
See application file for complete search history.

(56) References Cited

U.S. PATENT DOCUMENTS

| | | | |
|---|---|---|---|
| 2,510,365 A | | 6/1950 | Barnett et al. |
| 2,864,388 A | * | 12/1958 | Oliver ............ 135/133 |
| 3,773,379 A | * | 11/1973 | Loiseau ........... 296/107.09 |
| 4,310,194 A | * | 1/1982 | Biller ............ 296/159 |
| 4,883,305 A | | 11/1989 | Horton |
| 4,964,669 A | * | 10/1990 | Geier ............ 296/108 |
| 5,066,063 A | * | 11/1991 | Mullally .......... 296/100.18 |
| 5,238,288 A | * | 8/1993 | Chandler ......... 296/100.18 |
| 5,385,377 A | * | 1/1995 | Girard ........... 296/36 |
| 5,556,156 A | * | 9/1996 | Kirk ............. 296/100.15 |
| 5,752,736 A | * | 5/1998 | Nodier ........... 296/100.18 |
| 5,769,482 A | | 6/1998 | Kirk |
| 5,775,767 A | * | 7/1998 | Harrison et al. .... 296/107.09 |
| 6,000,745 A | | 12/1999 | Alexa |
| 6,003,929 A | * | 12/1999 | Birdsell .......... 296/100.16 |
| 6,209,944 B1 | | 4/2001 | Billiu et al. |
| 6,227,592 B1 | | 5/2001 | Thacker |
| 6,439,646 B1 | * | 8/2002 | Cornelius ......... 296/164 |
| 6,481,748 B1 | | 11/2002 | Cargill |
| 6,619,719 B1 | * | 9/2003 | Wheatley ......... 296/100.15 |
| 6,666,490 B1 | | 12/2003 | Thacker |
| 6,799,787 B1 | | 10/2004 | Angelos |
| 6,942,279 B1 | | 9/2005 | Hoover |
| 2002/0135199 A1 | | 9/2002 | Hanning |

* cited by examiner

*Primary Examiner*—Dennis H. Pedder
*Assistant Examiner*—Greg Blankenship
(74) *Attorney, Agent, or Firm*—Antoinette M. Tease

(57) ABSTRACT

A collapsible truck bed cover comprising a frame and an outer covering, wherein the frame comprises four primary support bars, four secondary support bars, and four cross bars. The primary support bars are pivotally connected to each other at a swinging pivot point. The secondary support bars are pivotally connected to the primary support bars. The two rear primary support bars are pivotally connected to the truck bed rails at two stationary pivot points. When the cover is fully collapsed, it fits underneath an existing tonneau cover.

19 Claims, 13 Drawing Sheets

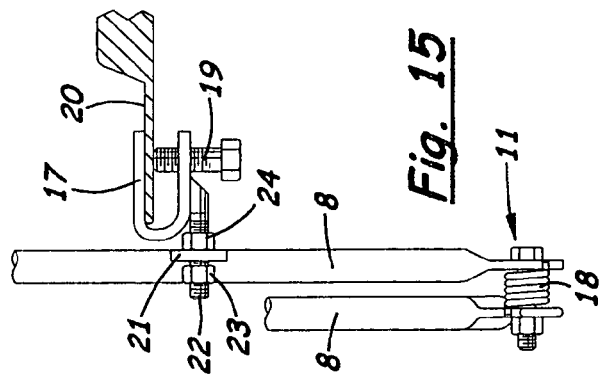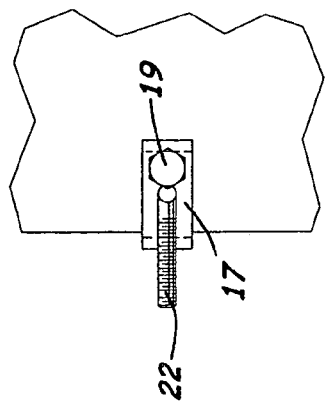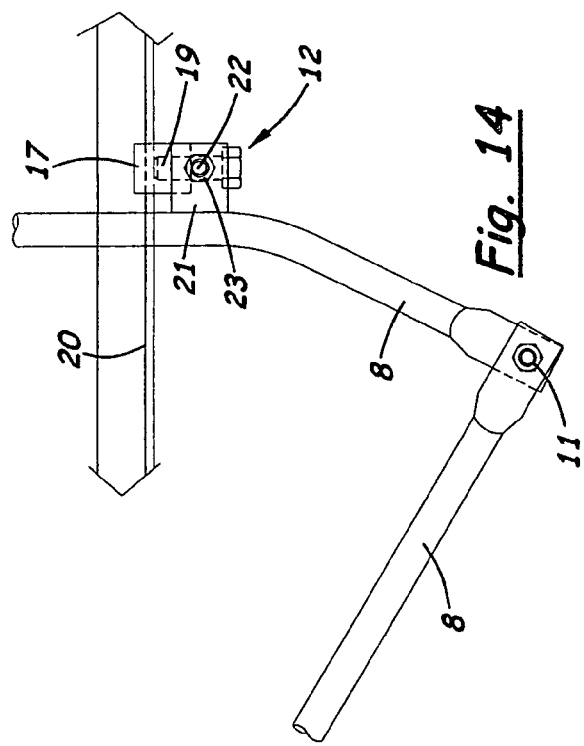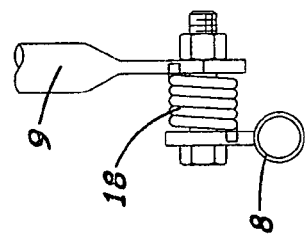

COLLAPSIBLE TRUCK BED COVER

BACKGROUND OF THE INVENTION

1. Field of the Invention

The present invention relates generally to the field of vehicle accessories, and more specifically, to a collapsible truck bed cover.

2. Description of the Related Art

A number of truck bed covers have been patented or are the subject of pending patent applications. With one exception (discussed below), none of these truck bed covers fits underneath a tonneau cover. Some of these covers are foldable, but none of them provides the advantages of the present invention in terms of structural support and ease of use.

U.S. Pat. No. 5,238,288 (Chandler, 1993) discloses a collapsible pickup truck bed cover that operates by means of a sliding rail and two slides on either side of the truck bed. To the applicant's knowledge, this is the only other truck bed cover that fits underneath a tonneau cover. The design of this particular cover is such that rain, snow and other material would tend to accumulate in the center of the cover, causing it to sag and eventually fail over time. A sagging cover will also increase wind resistance. The present invention solves this problem by providing a single, centrally located pivot point on either side of the truck bed. As discussed more fully below, the single pivot point and longer primary support bars allow the cross bars to be spaced further apart, which in turn provides greater support for the center of the cover.

In addition, at least three steps are required to collapse the Chandler cover, namely, sliding the front slides on either side of the truck body toward the rear slides, rotating the frame toward the front of the truck body, and then sliding all four slides forward so that the cover is out of the way of other cargo in the truck bed. With the present invention, on the other hand, the frame fully collapses into position directly underneath the rear of the cab in one motion. The ability to collapse the cover in a single motion is enabled by the single swinging pivot point on either side of the truck bed.

U.S. Pat. No. 4,964,669 (Geier, 1990) provides a foldable top for a truck bed. The frame provides greater protection for the center of the truck bed cover than the Chandler invention, but the top does not fully collapse underneath the rear of the cab. Instead, when fully folded, the frame lies above the truck bed. Thus, this particular cover could not be used with a tonneau cover.

U.S. Pat. No. 3,773,379 (Loiseau, 1973) describes a folding cover for a pickup truck in which the frame design is somewhat similar to the design of the present invention, with at least one major exception. Instead of a swinging single pivot point on either side of the truck bed, the Loiseau invention has two stationary pivot points (one for the front frame and one for the rear frame) on either side of the truck bed. In fact, the front and rear frames are not even connected to each other. Thus, the Loiseau cover cannot be fully collapsed and swung forward, as in the present invention. Instead, the cover simply folds up on top of the truck bed.

U.S. Pat. No. 5,556,156 (Kirk, 1996) and U.S. Pat. No. 5,769,482 (Kirk, 1998) involve a collapsible truck bed cover in which the frame comprises three relatively parallel U-shaped members that extend over and above the truck bed from one side to another. At the front of the truck bed is a tarpaulin receiving structure. To collapse the truck bed cover, the U-shaped members are removed, and the tarpaulin is stored in the tarpaulin receiving structure.

U.S. Pat. No. 6,799,787 (Angelos, 2004) discloses a truck bed cover that transforms from a fully extended cover to a fully collapsed cover through the use of a plurality of pneumatic cylinders. When in the fully extended position, the cover resembles a hard truck bed cover. When in the fully collapsed position, the cover resembles a tonneau cover.

U.S. Pat. No. 6,666,490 (Thacker, 2003) and U.S. Pat. No. 6,227,592 (Thacker, 2001) provide a rigid truck bed cover that uses gas springs to go from an open to a closed position and vice versa. When in an open position, the cover extends over the rear of the truck bed and beyond the tailgate to provide shade for the user. When in a closed position, the cover lies level with the top of the truck bed and completely encloses the truck bed.

U.S. Pat. No. 6,209,944 (Billiu et al., 2001) describes a truck bed enclosure with a stowable hard cover mounted on top of a frame. The frame is raised and lowered by hydraulic or other fluid cylinders. When lowered, the cover encloses the truck bed.

U.S. Pat. No. 2,510,365 (Barnett et al., 1950) involves a foldable canopy frame for a pickup truck. Four side rail sections that extend horizontally from front to back above each side of the truck bed, as well as slidable hooks at the bottom of the frame, allow the rear part of the frame to slide rearward to open the frame or forward to close it. When the frame is closed, it folds up against the rear of the cab and extends slightly above the roof of the cab.

U.S. Pat. No. 6,481,784 (Cargill, 2002) discloses a pickup truck tent camping system. The system comprises a platform assembly that is installed in the truck bed and suspended above the floor of the truck bed, a tent assembly that is installed over the platform assembly, and a ten cover that is installed over the tent assembly.

U.S. Pat. No. 6,000,745 (Alexa, 1999) provides a pickup truck bed cover that comprises a plurality of U-shaped frame members and a cover. The U-shaped frame members are attached to the truck bed with rollers that allow the frame to be collapsed against the rear of the cab.

U.S. Pat. No. 4,883,305 (Horton, 1989) describes a collapsible canopy for a pickup truck. The canopy comprises a pair of channel members that are mounted on top of the side walls of the truck bed, slide members that are mounted within each channel member, a plurality of arch-shaped rigid stays that extend across the truck bed and that are mounted adjacent to and parallel with one another, and a flexible canopy cover. Elastic bands connect the rigid stays and cause them to draw together when a latch that holds the stays apart is released, thereby collapsing the frame against the rear of the cab.

U.S. Pat. No. 6,942,279 (Hoover, 2005) involves a camper shell that is collapsible and portable. The shell fits over the bed of a pickup truck, and the frame angles downward from rear to front to allow for drainage. To collapse the shell, it must be taken apart.

U.S. Pat. No. 5,752,736 (Nodier, 1998) discloses a truck bed cover comprising a frame and an outer covering. The frame comprises four vertical supports, which are connected by four horizontal supports. Each horizontal support has a pivot point in its middle that allows the frame to be collapsed.

U.S. Pat. No. 6,439,646 (Cornelius, 2002) provides a soft shell camper for use on top of a pickup truck bed. The camper comprises a frame and a flexible outer covering. The frame is removably attached to the truck bed, but it is not otherwise collapsible.

U.S. Patent Application No. 2002/0135199 (Hanning) describes a retractable protective cover assembly for a pickup truck bed. The cover assembly comprises a pair of elongated guide tracks and rollers on each of the sides of the truck bed. A plurality of frame members is attached to the rollers. Expansion brackets connect the frame members to one another. The bottom end of each expansion brackets slides vertically up and down on the frame member, which allows the entire frame to collapse.

In light of the foregoing, it is an object of the present invention to provide a truck bed cover that has a flexible outer covering, that provides adequate support for the center of the covering, that collapses in a single motion, that fits underneath a tonneau cover, and that takes up a minimal amount of space in the truck bed. It is a further object of the present invention to provide a truck bed cover that possesses all of the above-mentioned attributes and is still relatively inexpensive to manufacture and relatively easy to install and use.

BRIEF SUMMARY OF THE INVENTION

The present invention is a collapsible truck bed cover comprising a frame and an outer covering, wherein the frame comprises four primary support bars, four secondary support bars, and four cross bars; wherein two of the primary support bars and two of the secondary support bars are located on each side of the frame; wherein the cross bars connect one side of the frame to the other; wherein on each side of the frame, two of the primary support bars are pivotally connected to each other at one end of each primary support bar; wherein each primary support bar is connected to a cross bar at the end of the primary support bar that is not connected to the other primary support bar; wherein each secondary support bar is connected to one of the primary support bars at one end of the secondary support bar; wherein the point at which each secondary support bars connects to a primary support bar is a pivot point; wherein each secondary support bar is connected to a cross bar at the end of the secondary support bar that is not connected to a primary support bar; wherein two of the cross bars connect the four secondary support bars; and wherein two of the cross bars connect the four primary support bars. In a preferred embodiment, the present invention further comprises a torsion spring at each of the four pivot points at which a secondary support bar connects to a primary support bar, wherein the torsion spring biases the secondary support bars toward the primary support bars to facilitate the collapsing of the frame.

In a preferred embodiment, the four primary support bars comprise two front primary support bars and two rear primary support bars, the frame attaches to the truck bed by means of a stationary pivot point on either side of the truck bed, and the pivot point is located on the two rear primary support bars. Each stationary pivot point preferably comprises a torsion spring that biases one of the rear primary support bars toward one of the front primary support bars to facilitate the collapsing of the frame.

In a preferred embodiment, the point at which the primary support bars are connected to one another is a swinging pivot point, such that when the frame is collapsed, the swinging pivot point moves toward the rear of the vehicle, and when the frame is opened, the swinging pivot point moves toward the front of the vehicle. Each swinging pivot point preferably comprises a torsion spring that biases the primary support bars toward each other to facilitate the collapsing of the frame.

In a preferred embodiment, when the frame is in a full open position, the angle between each primary support bar and the secondary support bar to which it is attached is approximately ninety (90) degrees. Preferably, when the frame is in a full open position, the angle between each primary support bar and the top of the truck bed (as shown by angle A in FIG. 2) is approximately forty-five (45) degrees.

In a preferred embodiment, the four primary support bars comprise two front primary support bars and two rear primary support bars, and the top end of each of the two front primary support bars is curved. Preferably, the outer covering is comprised of a flexible material, and the outer covering comprises one or more windows. The windows are preferably comprised of transparent vinyl.

In a preferred embodiment, the present invention further comprises four straps, wherein the outer covering comprises a top panel, wherein the four cross bars comprise two front cross bars and two rear cross bars, wherein two of the straps connect the two front cross bars and two of the straps connect the two rear cross bars, and wherein the straps lie directly beneath the top panel of the outer covering. Each of the four cross bars is preferably inserted into a sleeve that is sewn onto the underside of the top panel.

In a preferred embodiment, the present invention further comprises two straps, wherein the outer covering comprises a top panel, and wherein each strap is attached to the top panel at one end and removably attached to the rear end of the truck bed at the other end. Preferably, the present invention further comprises two cords, wherein the outer covering comprises a rear panel, and wherein each cord is attached to the bottom end of the rear panel at one end and removably attached to the rear end of the truck bed at the other end.

In a preferred embodiment, the present invention comprises four zippers, wherein the outer covering comprises a top panel, two side panels, a front panel, and a rear panel, and wherein two of the zippers are situated between the front panel and one of the side panels, and wherein two of the zippers are situated between the rear panel and one of the side panels. The rear panel optionally comprises a tailgate cover piece, which is preferably contoured to fit the shape of the tailgate.

The present invention is designed so that when the cover is fully collapsed, it fits underneath an existing tonneau cover.

BRIEF DESCRIPTION OF THE DRAWINGS

FIG. 14 is a detail view of the swinging pivot point shown in FIG. 3.

FIG. 15 is a detail view of the C-clamp that attaches the collapsible truck bed cover of the present invention to one side of the truck bed.

FIG. 16 is a bottom view of the C-clamp of FIG. 15.

FIG. 17 is a detail view of one of the six torsion springs used in the collapsible truck bed cover of the present invention.

REFERENCE NUMBERS

Figure 1:
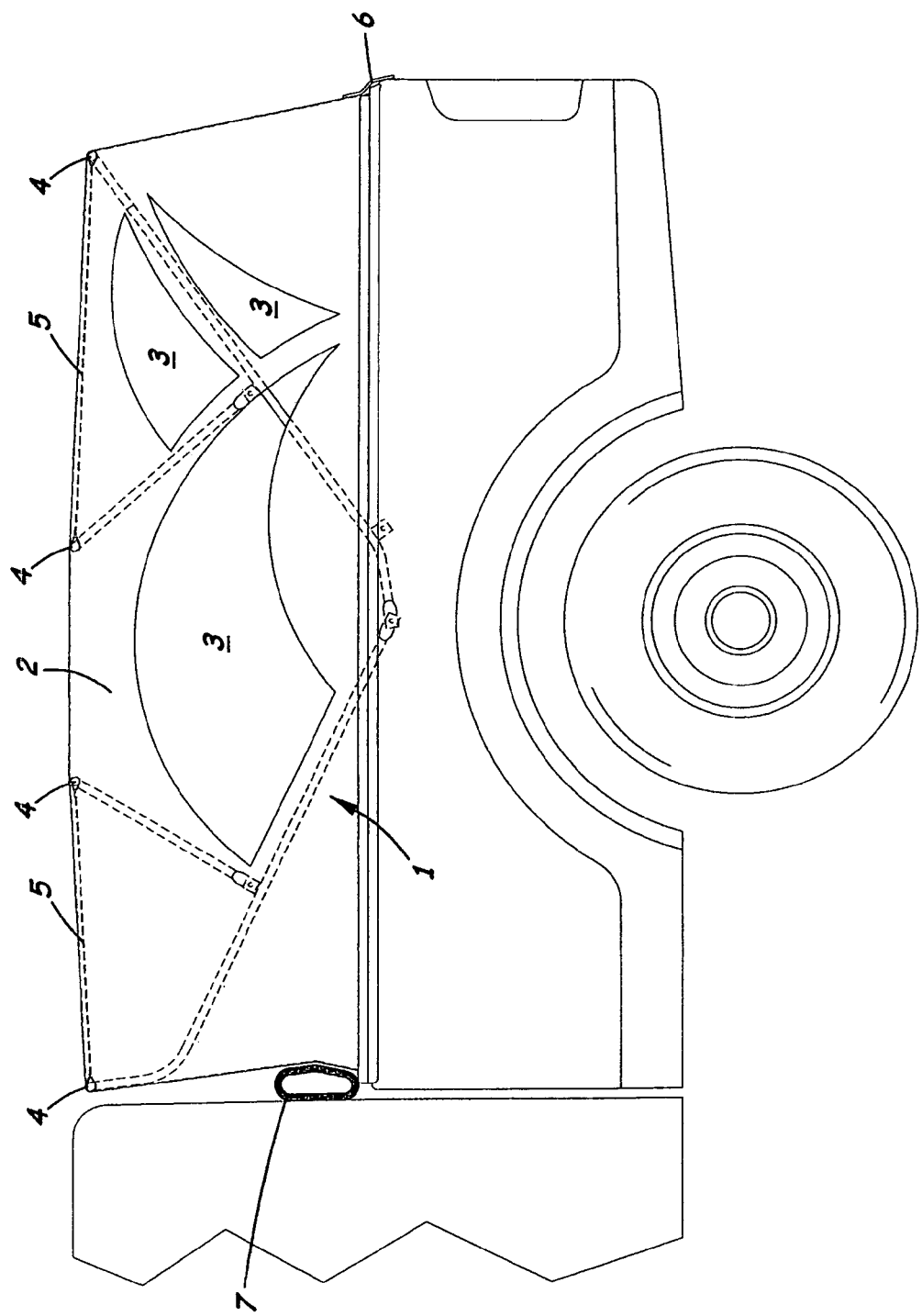
FIG. 1 is a side view of the collapsible truck bed cover of the present invention installed and in the full open position. The cover is shown with the outer covering.

1 Frame
2 Outer covering
3 Window
4 Cross bar
5 Strap (connecting cross bars)
6 Tailgate cover piece
7 Tonneau cover
8 Primary support bar
9 Secondary support bar
10 Pivot point (where secondary support bar connects to primary support bar)
11 Swinging pivot point (where two primary support bars connect)
12 Pivoting attachment point
13 Strap (for holding outer covering in storage position)
14 Zipper
15 Strap (for holding down top panel of outer covering)
16 Cord
17 C-clamp
18 Torsion spring
19 Bolt (for securing C-clamp to truck bed rail)
20 Truck bed rail
21 Plate
22 Bolt (for attaching plate to C-clamp)
23 Nut (for securing bolt #22)
24 Nut (for separating plate from C-clamp)

DETAILED DESCRIPTION OF INVENTION

FIG. 1 is a side view of the collapsible truck bed cover of the present invention installed and in the full open position. The cover is shown with the outer covering. The truck bed cover comprises a frame 1 and an outer covering 2, which lies over the frame 1. The outer covering 2 comprises a top panel, two side panels, a rear panel, and a front panel, all of which are preferably made of a durable and flexible material. The outer covering 2 preferably comprises one or more windows 3, which are preferably made of transparent vinyl.

The cover is designed so that it can be used with or without an existing tonneau cover 7. If used with a tonneau cover 7, the tonneau cover 7 can be rolled up and stowed between the cab of the truck and the front of the cover, as shown in FIG. 1.

The frame comprises four cross bars 4, which span the width (side to side) of the truck bed. Four straps 5 (only two of which are shown in FIG. 1) connect the two front cross bars 4 and the two rear cross bars 4. The purpose of the straps 5 is to prevent the cross bars 4 from opening too far and also to provide additional support for the top panel of the outer covering 2. The straps are optionally adjustable. If adjustable, the straps can be adjusted to provide more or less tension on the top panel of the outer covering.

Figure 2:
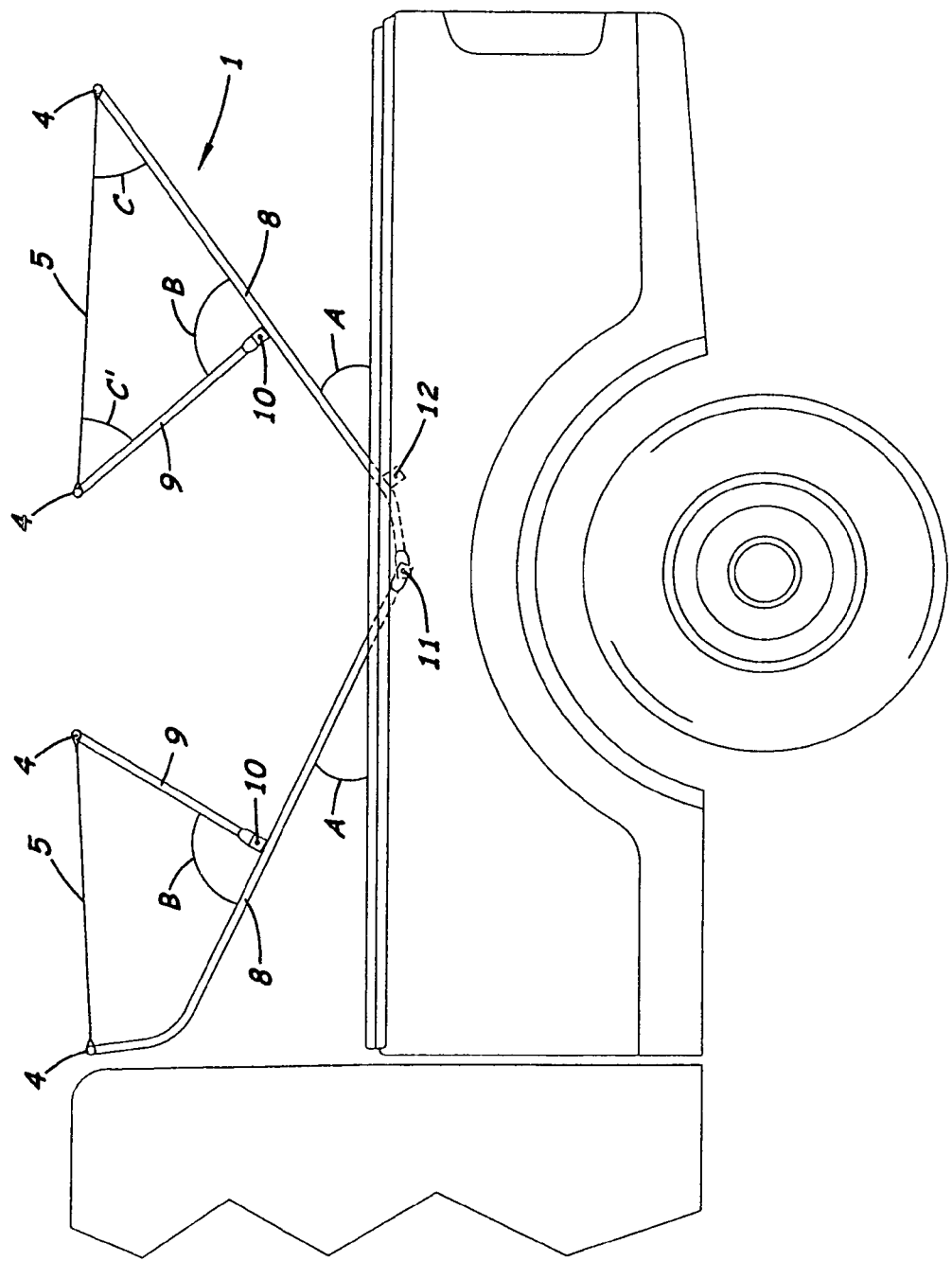
FIG. 2 is a side view of the collapsible truck bed cover of the present invention installed and in the full open position. The cover is shown without the outer covering.
Figure 3:
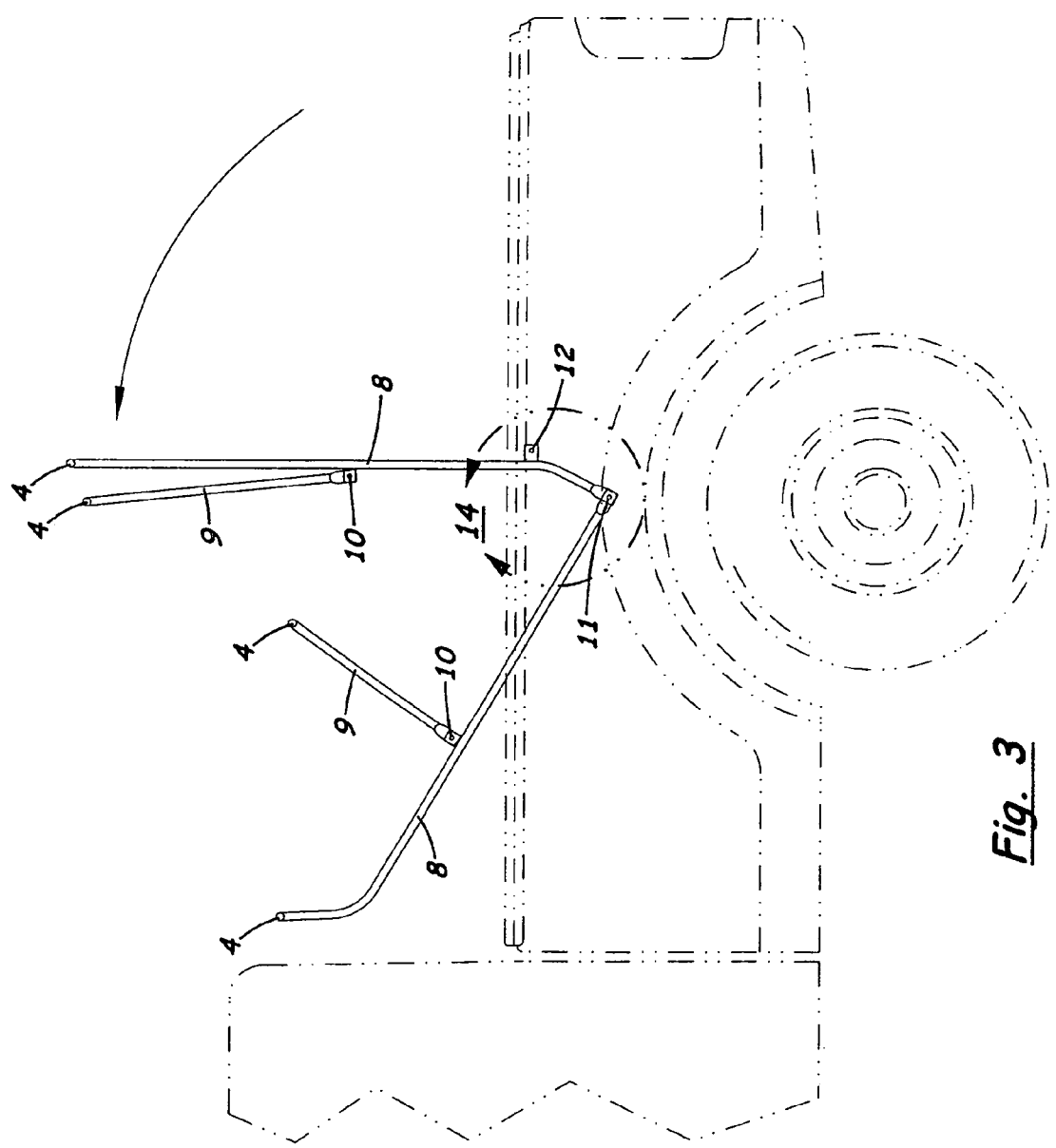
FIG. 3 is a side view of the frame of the collapsible truck bed cover of the present invention in a partially collapsed position. The cover is shown without the outer covering.
Figure 4:
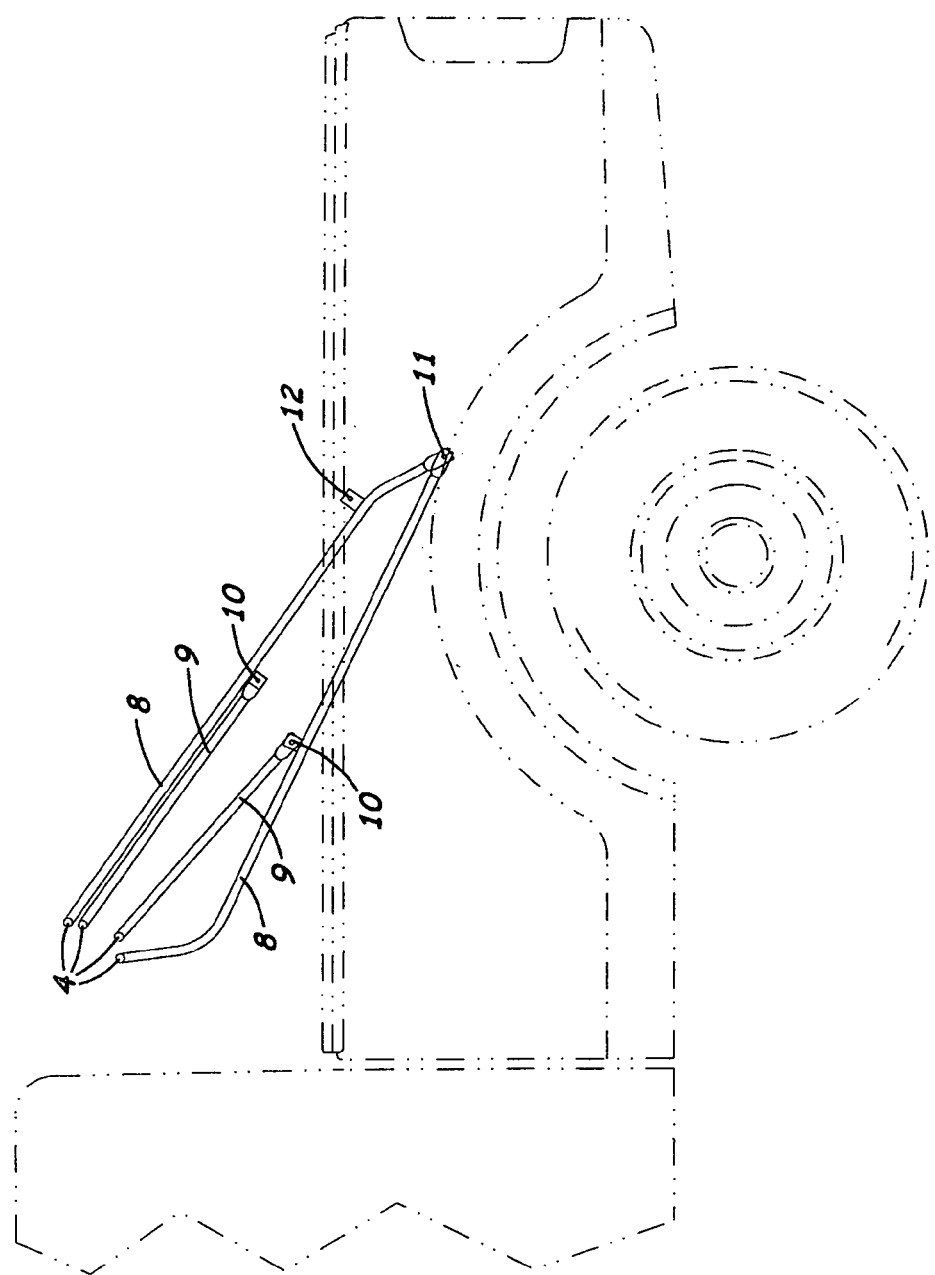
FIG. 4 is a side view of the frame of the collapsible truck bed cover of the present invention in a partially collapsed position (more collapsed than in FIG. 3). The cover is shown without the outer covering.
Figure 5:
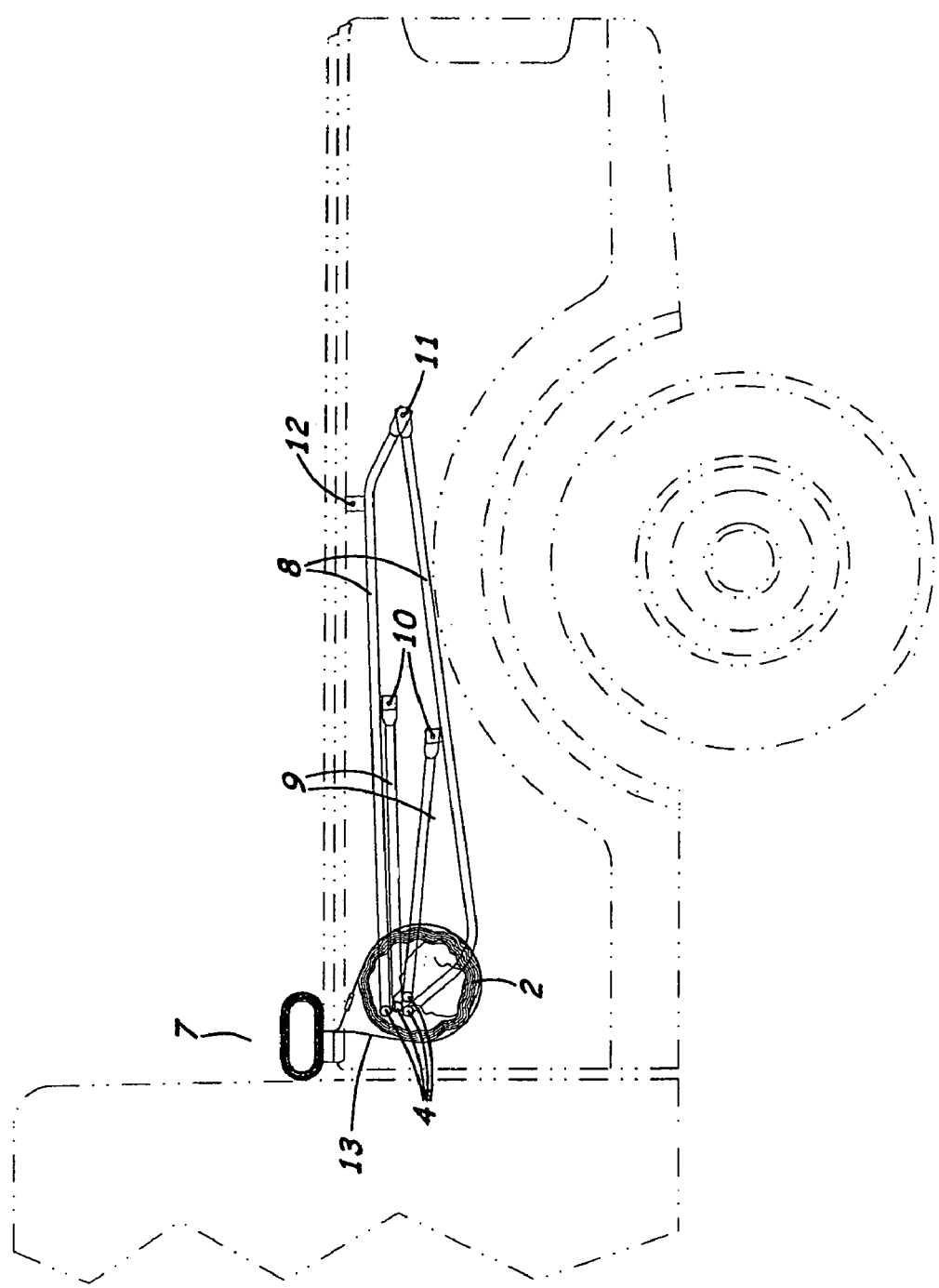
FIG. 5 is a side view of the collapsible truck bed cover of the present invention in a fully collapsed position. The cover is shown folded up and stored directly underneath the tonneau cover.

FIG. 2 is a side view of the collapsible truck bed cover of the present invention installed and in the full open position. The cover is shown without the outer covering. In addition to the four cross bars 4, the frame further comprises two primary support bars 8 and two secondary support bars 9. The secondary support bars 8 attach to the primary support bars 8 at two pivot points 10. These pivot points allow the secondary support bars 9 to be folded toward the primary support bars 8, as shown in FIGS. 3–5. The two primary support bars 8 are connected to each other at a single swinging pivot point 11 on either side of the truck bed. The frame 1 is connected to the truck bed at a pivoting attachment point 12 on each side of the truck bed. Thus, to assemble the cover, the frame need only be attached to the truck bed at two points.

FIG. 3 is a side view of the frame of the collapsible truck bed cover of the present invention in a partially collapsed position. The cover is shown without the outer covering and without the straps 5. In this view, the frame has been partially folded up toward the rear of the cab. As this figure illustrates, as the frame is collapsed, the rear secondary bar 9 moves toward the rear primary bar 8. In addition, the swinging pivot point 11 moves toward the rear of the vehicle. A more detailed view of the swinging pivot point 11 is provided in FIG. 14. The top end of the front primary bar 8 is preferably curved to contour the shape of the front panel of the outer covering 2 to the shape of the cab and to allow the frame to clear the header bar of the tonneau cover when the frame is collapsed.

FIG. 4 is a side view of the frame of the collapsible truck bed cover of the present invention in a partially collapsed position (more collapsed than in FIG. 3). The cover is shown without the outer covering and without the straps 5. This figure is similar to FIG. 3, except that the frame has been further collapsed. As shown in this figure, the front secondary bar 9 has pivoted toward the front primary bar 8, and the rear secondary bar 9 now lies flat against the rear primary bar 8. The swinging pivot point 11 has moved even further toward the rear of the vehicle. The only stationary point on the entire frame is the pivoting attachment point 12.

Figure 5A:
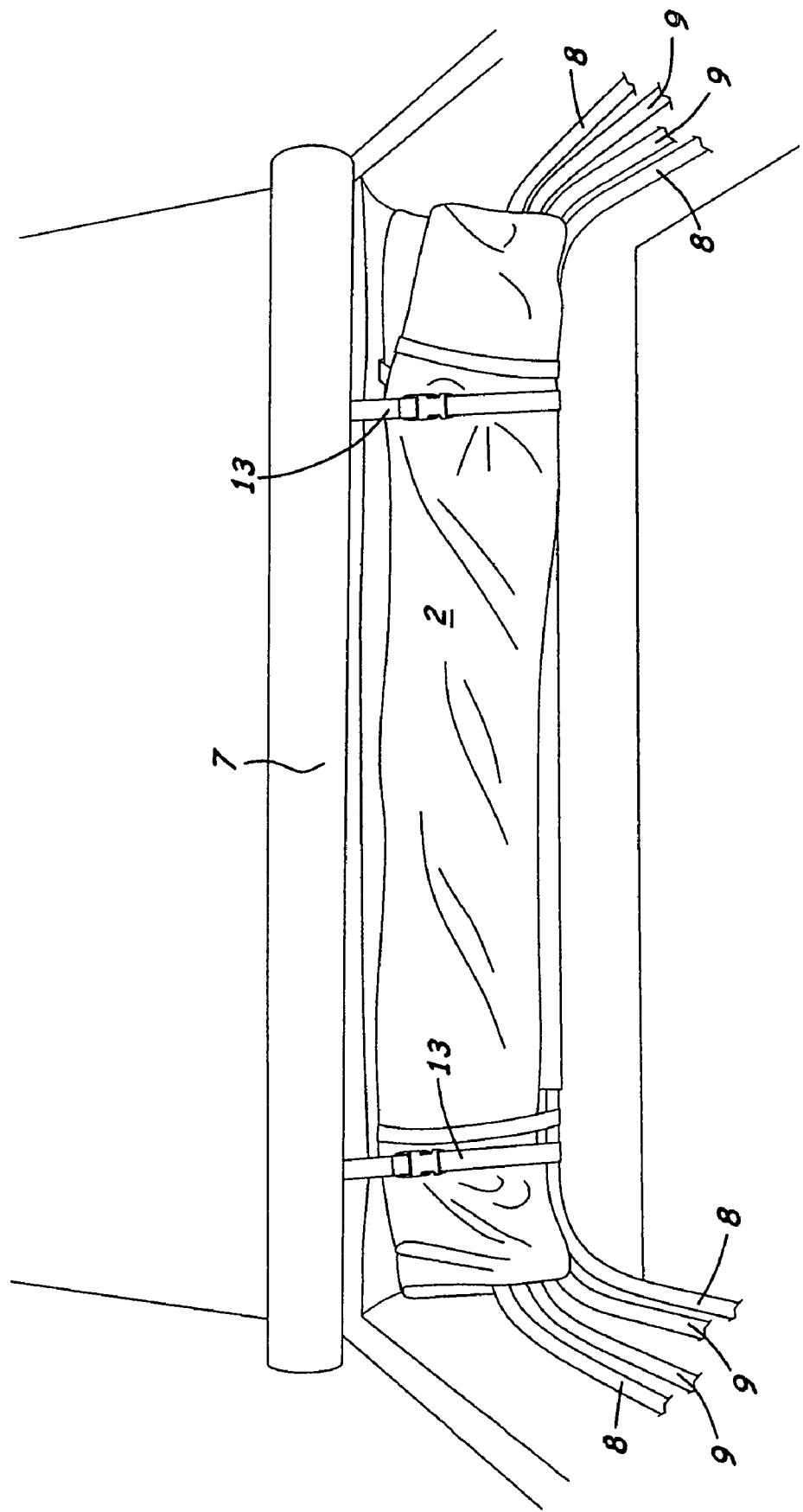
FIG. 5A is a rear view of the collapsible truck bed cover of the present invention in a fully collapsed position. The cover is shown folded up and stored directly underneath the tonneau cover.

FIG. 5 is a side view of the collapsible truck bed cover of the present invention in a fully collapsed position. The cover is shown folded up and stored directly underneath the tonneau cover. In this view, the secondary support bars 9 are folded up against the primary support bars 8 (the front secondary support bar 9 does not lie completely flat against the front primary support bar 8 because the front primary support bar 8 is curved), the swinging pivot point 12 is in its most rearward position, and the outer covering 2 is held by one or more straps 13 that extend downward from the tonneau cover 7 and maintain the outer covering 2 is a stowed position. The present invention is not limited to any particular method of stowing the outer covering. For example, a cradle could be used instead of straps. FIG. 5A is a rear view of the collapsible truck bed cover of the present invention in the same position as shown in FIG. 5.

Figure 6:
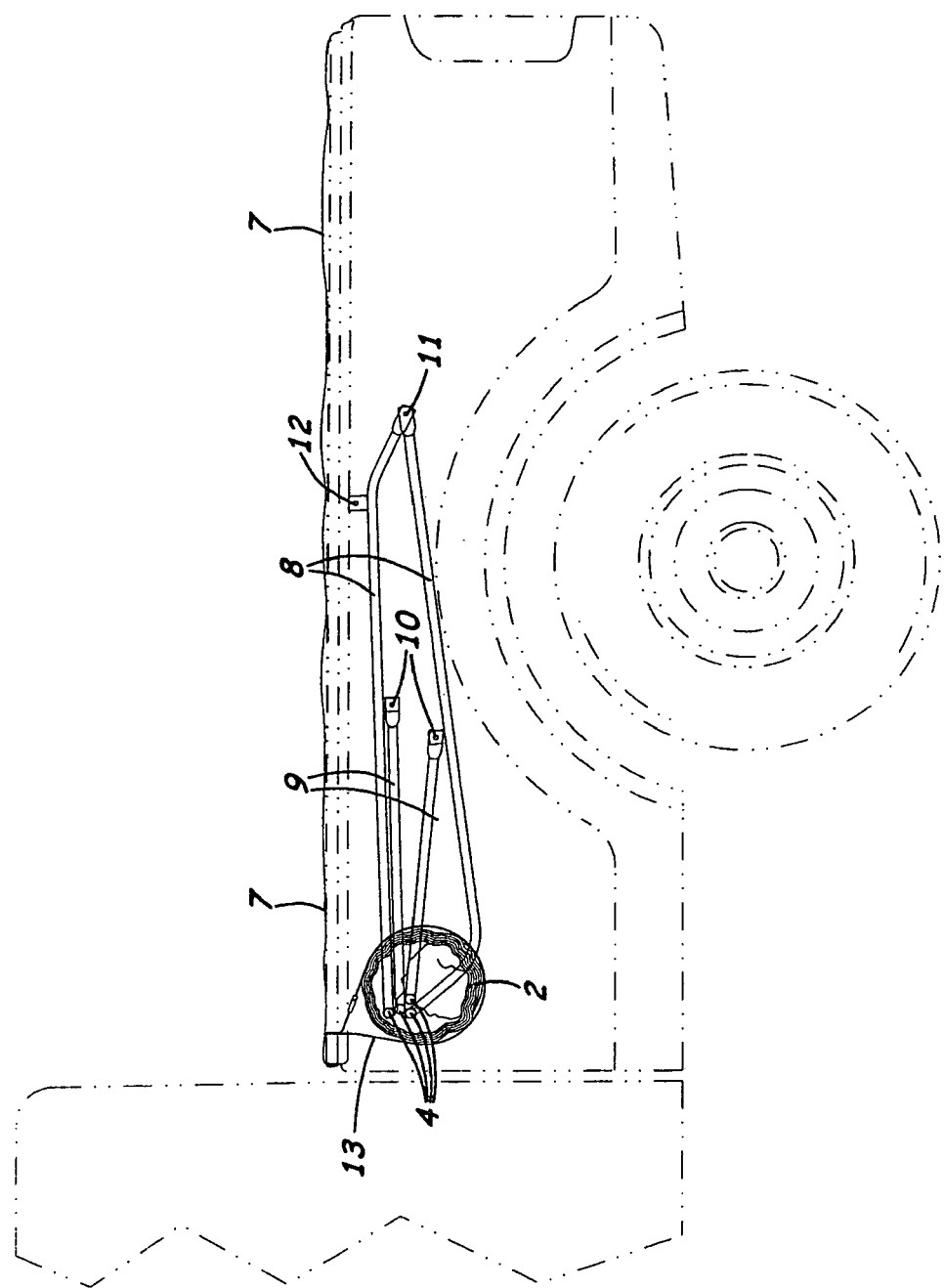
FIG. 6 is a side view of the collapsible truck bed cover of the present invention in a fully collapsed position with the tonneau cover fully extended over the truck body.

FIG. 6 is a side view of the collapsible truck bed cover of the present invention in a fully collapsed position with the tonneau cover fully extended over the truck body. This view is the same view as in FIG. 5, except that the tonneau cover 7 has been pulled out over the top of the truck bed. The purpose of this figure is to illustrate that the cover of the present invention can be fully stored underneath a tonneau cover when the tonneau cover is in use. Conversely, as shown in FIG. 1, the tonneau cover can be fully stored in front of the truck bed cover of the present invention when the truck bed cover is in use. This design provides added versatility for the vehicle owner.

Figure 7:
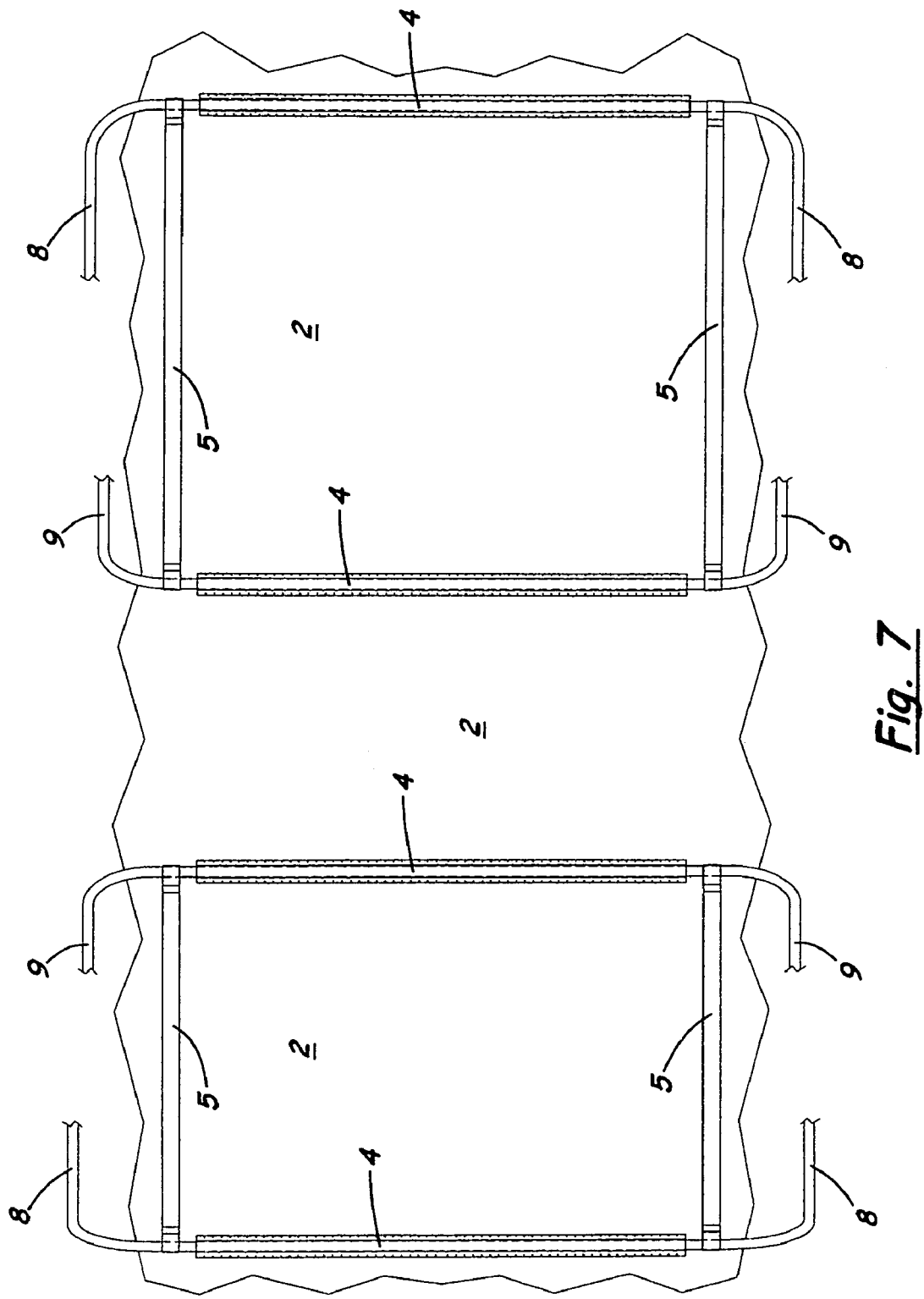
FIG. 7 is a bottom view of the ceiling of the collapsible truck bed cover of the present invention when it is installed and in the full open position.

FIG. 7 is a bottom view of the ceiling of the collapsible truck bed cover of the present invention when it is installed and in the full open position. This view shows the four cross bars 4 of the frame 1 and the four straps 5 that connect the two front cross bars 4 and the two rear cross bars 4. The two inner-most cross bars 4 are connected to the secondary support bars 9, and the two outer-most cross bars 4 are connected to the primary support bars 8. The four cross bars 4 are preferably inserted into a sleeve that is sewn onto the underside of the top panel of the outer covering 2 to provide additional stability for the outer covering 2 while the vehicle is in motion and to ensure the proper fit of the outer covering 2 over the frame 1 when the cover is in the full open position. Preferably, the sleeve can be opened and closed by VELCRO® or similar means.

Figure 8:
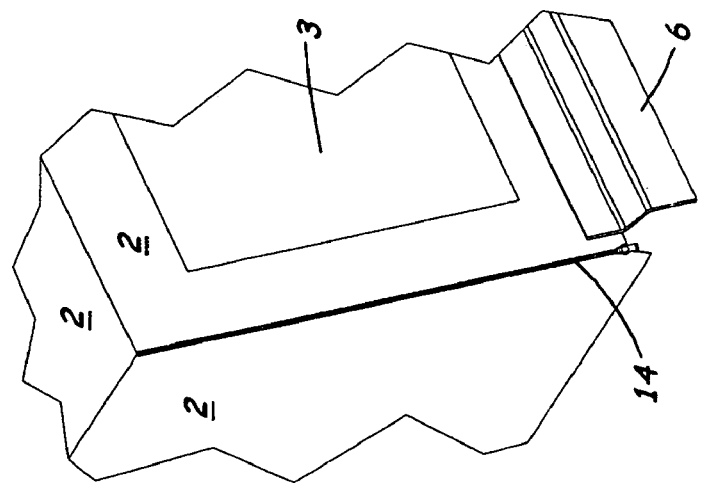
FIG. 8 is a detail view of the zipper at one of the rear corners of the collapsible truck bed cover of the present invention.

FIG. 8 is a detail view of the zipper at one of the rear corners of the collapsible truck bed cover of the present invention. The outer covering 2 preferably comprises four zippers 14, one at each of the four corners of the truck bed. The zippers 14 are vertical, and they allow the side and rear panels of the outer covering to be flipped up and over the top panel of the outer covering for the "sun top" configuration (shown in FIG. 13). The zippers 14 are also necessary for opening and closing the cover (i.e., moving it from a full open position to a stowed position).

To open the cover from the stowed position shown in FIG. 5, the straps 13 (if straps are used to stow the cover) are unfastened, and the frame is simply opened up until it reaches the position shown in FIG. 1. The side and rear panels of the outer covering 2 are flipped down into position over the frame 1, the straps that hold down the top panel of the outer covering are fastened into place (see FIGS. 11 and 12), the cords that hold down the rear panel of the outer covering are fastened (see FIGS. 11 and 12A), and the zippers are closed. The bottom edges of the outer covering 2 are optionally secured to the top of the truck bed with VELCRO® or other suitable fastening mechanism. To stow the cover from a full open position, the zippers are unzipped, the side and rear panels of the outer covering are flipped up onto the top of the top panel of the outer covering, the straps 15 that hold down the top panel of the outer covering are unfastened, the cords that hold down the rear panel of the outer covering are unfastened, and the frame is folded up as shown in FIGS. 3–5.

Figure 9:
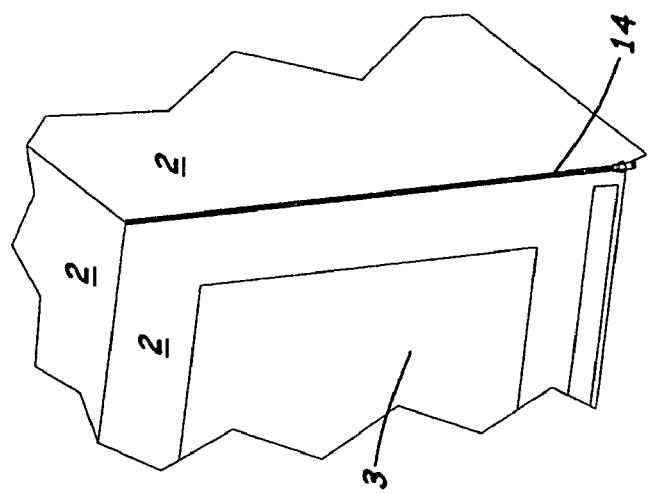
FIG. 9 is a detail view of the zipper at one of the front corners of the collapsible truck bed cover of the present invention.

FIG. 9 is a detail view of the zipper at one of the front corners of the collapsible truck bed cover of the present invention. Each zipper 14 preferably comprises a pull tab on both sides of the zipper 14 so that it can be opened and closed from either the outside or the inside of the truck bed.

Figure 10:
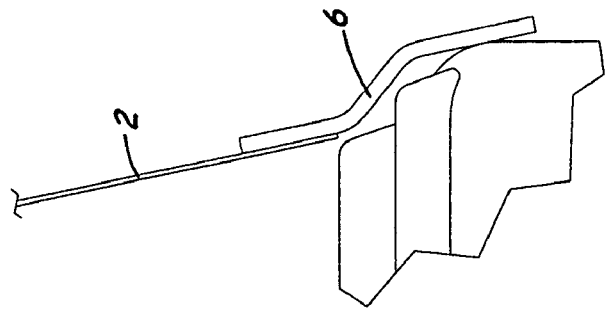
FIG. 10 is a detail view of the tailgate cover piece of the collapsible truck bed cover of the present invention.

FIG. 10 is a detail view of the tailgate cover piece of the collapsible truck bed cover of the present invention. To provide added security for the contents of the truck bed, the present invention preferably comprises a tailgate cover piece 6 that is contoured to fit the shape of the upper end of the tailgate. The tailgate cover piece 6 is preferably made of rigid plastic or other suitable material.

Figure 11:
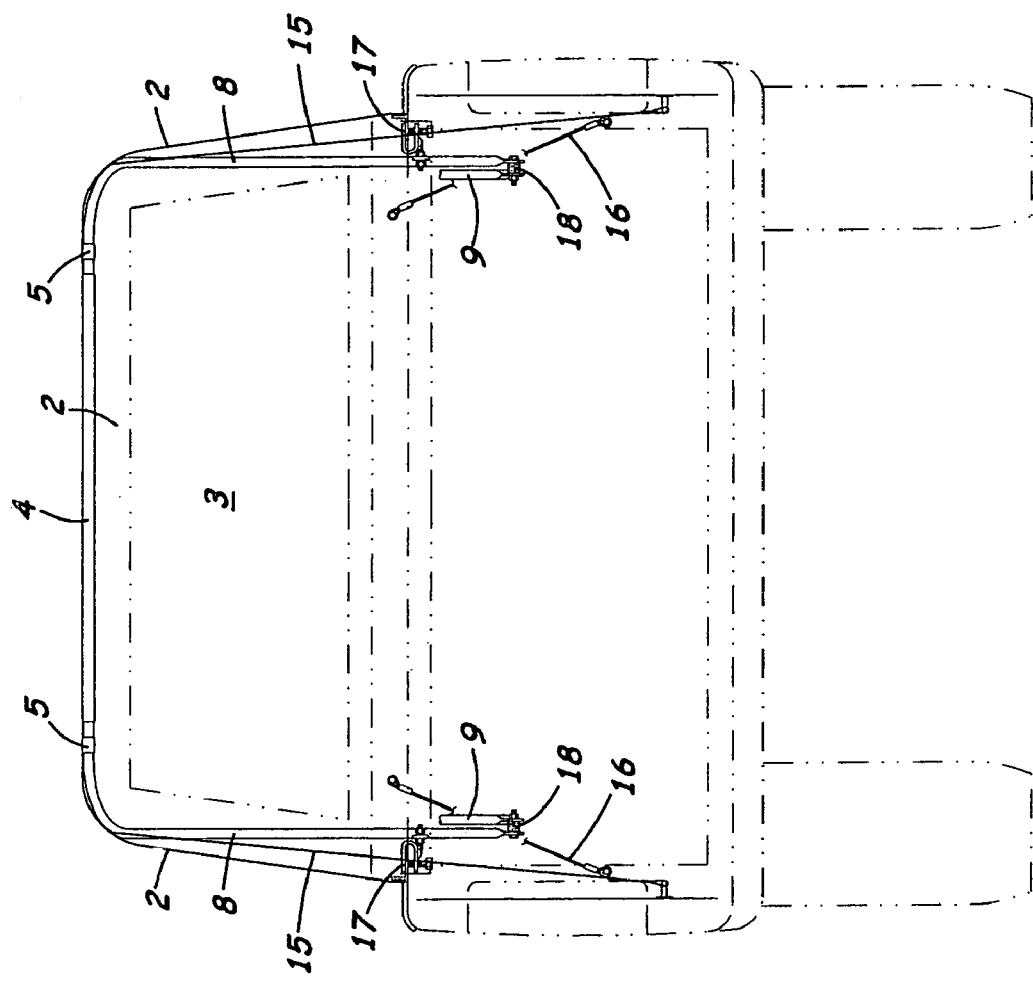
FIG. 11 is a rear view of the collapsible truck bed cover of the present invention installed and in the full open position.
Figures 12, 12A:
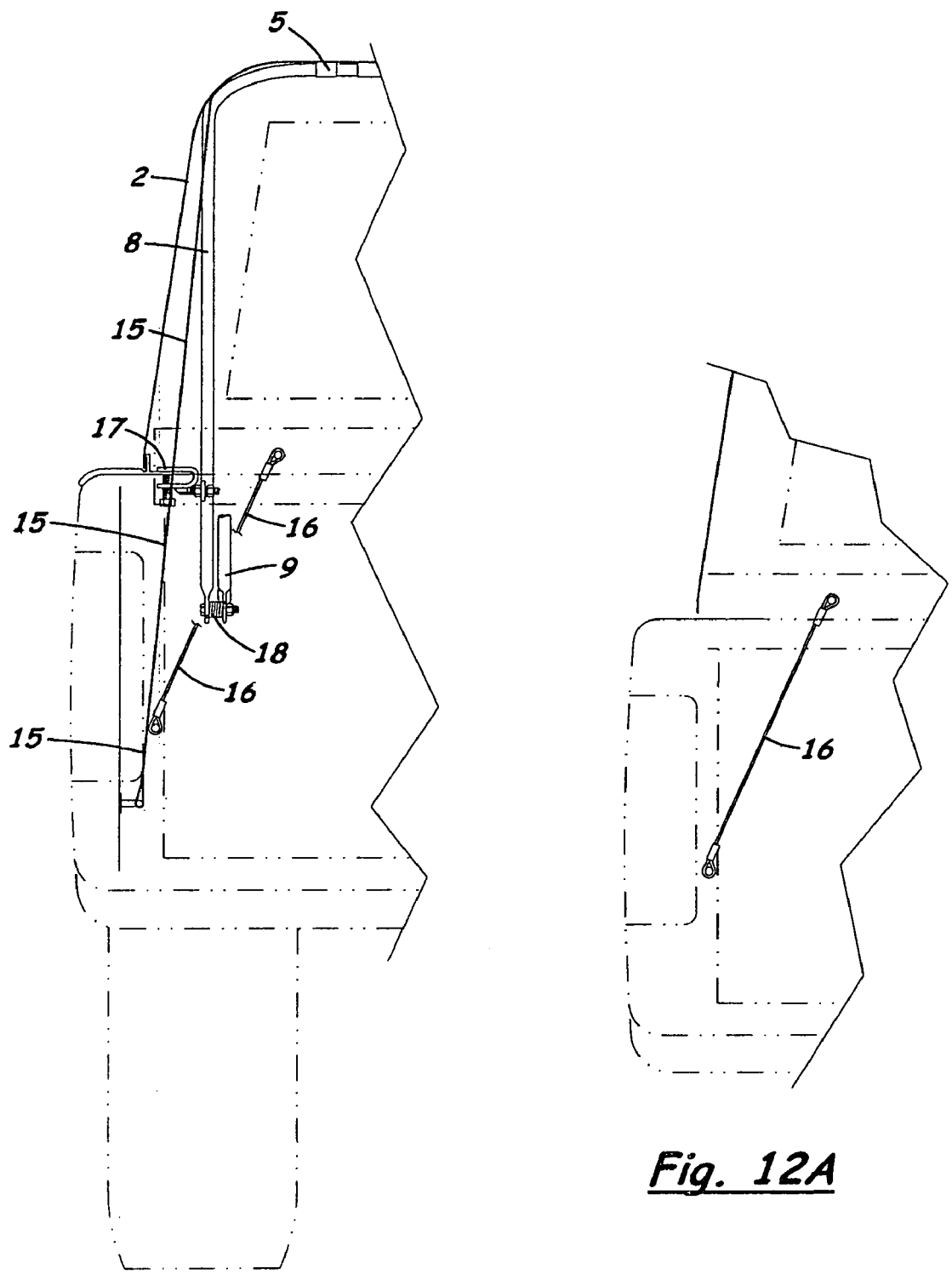
FIG. 12 is a detail view of one of the straps that holds down the top panel of the outer covering of the collapsible truck bed cover of the present invention.
FIG. 12A is a detail view of the cord that holds down the rear panel of the outer covering of the collapsible truck bed cover of the present invention.

FIG. 11 is a rear view of the collapsible truck bed cover of the present invention installed and in the full open position. In addition to the parts that have been previously discussed, this figure shows the optional straps 15 that hold down the top panel of the outer covering 2. There are preferably two straps, one on each side of the vehicle. Each strap is connected at one end to the underside of the top panel of the outer covering 2 at the rear end of the top panel, and at the other end to the inside of the truck bed at the rear of the vehicle. The straps may be removably or permanently attached to the top panel, but they must be removably attached to the truck bed so that they can be removed to stow the cover. FIG. 12 is a detail view of one of the straps 15 that holds down the top panel of the outer covering. Parts 17 and 18 are discussed in connection with FIGS. 14–17.

FIG. 11 also shows the optional cords 16 that hold down the rear panel of the outer covering 2. There are preferably two cords, one on each side of the vehicle. Each cord is connected at one end to the inside of the rear panel of the outer covering 2 toward the bottom of the rear panel, and at the other end to the inside of the truck bed at the rear of the vehicle. The cords may be removably or permanently attached to the rear panel, but they must be removably attached to the truck bed so that they can be removed to stow the cover. FIG. 12A is a detail view of one of the cords 16 that holds down the rear panel of the outer covering.

Figure 13:
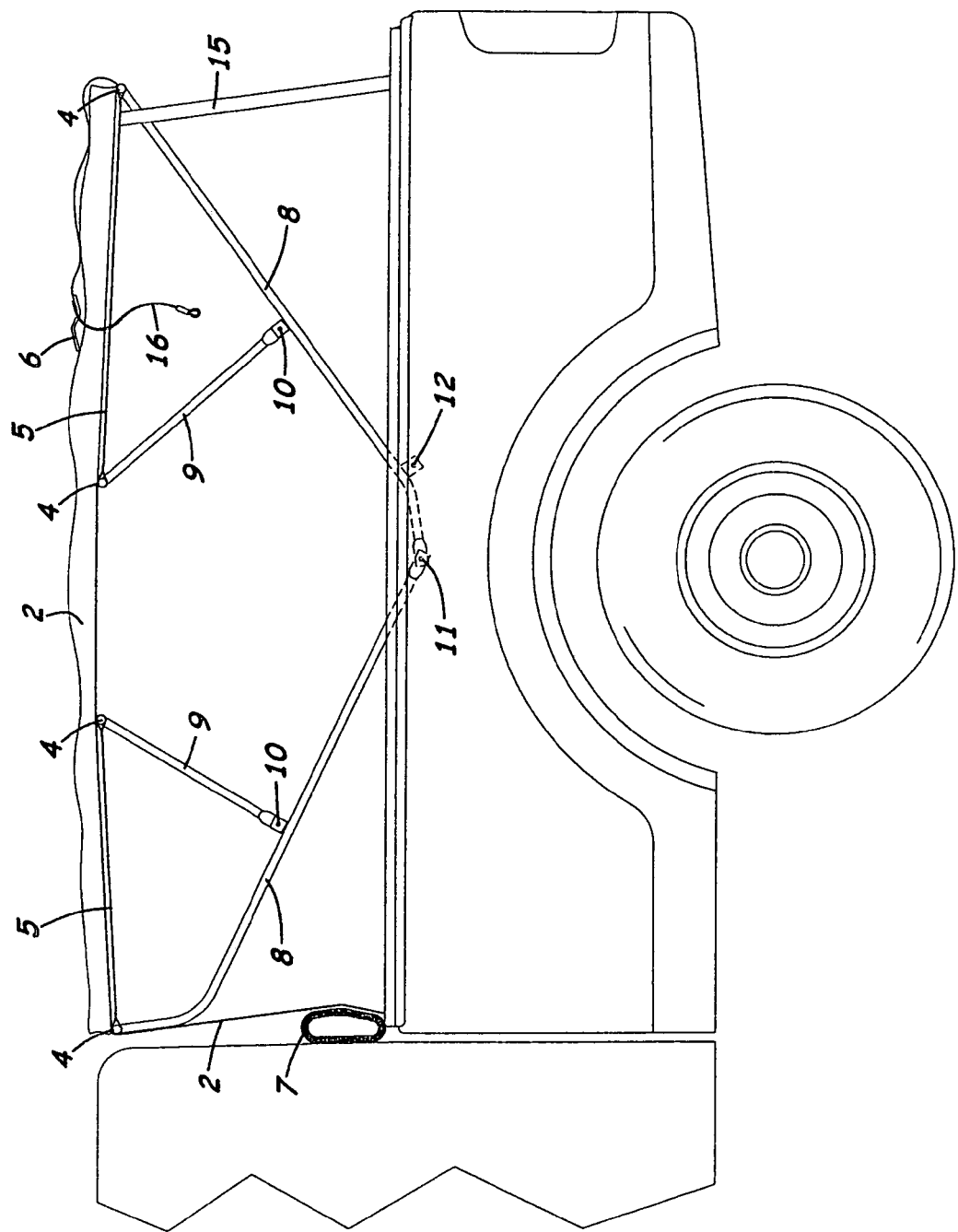
FIG. 13 is a side view of the collapsible truck bed cover of the present invention installed in the full open position with the rear and side panels of the outer covering flipped up onto the top panel of the outer covering to provide a "sun top" configuration.

FIG. 13 is a side view of the collapsible truck bed cover of the present invention installed and in the full open position with the rear and side panels of the outer covering flipped up onto the top panel of the outer covering to provide a "sun top" configuration. This configuration might be used when the vehicle is stationary to provide shade for the contents of the truck bed and/or for people. This figure also shows more clearly one of the straps 15 that holds down the top panel of the outer covering.

FIG. 14 is a detail view of the swinging pivot point shown in FIG. 3. This figure shows the two primary support bars 8, which are pivotally connected to each other at pivot point 11. This figure also shows the pivoting attachment point 12. The present invention is not limited to any particular configuration of the pivoting attachment point. One example of how the pivoting attachment point might be configured is provided in FIGS. 14–16. In this configuration, a plate 21 extends from the rear primary support bar 8 and is attached to a C-clamp 17 by means of a bolt 22. A removable nut 23 holds the bolt 22 in place. The bolt 22 passes through the plate 21 and is welded to the bottom of the C-clamp 17. The C-clamp 17 is held in place on the truck bed rail 20 by a headed bolt 19. Alternatively, instead of attaching to the truck bed rail, the C-clamp could attach to the tonneau cover rail. The present invention can be retrofitted to attach to any existing rail structure. To remove the frame, the nut 23 is removed, and the plate 21 is pulled off of the bolt 22. This design provides for quick and easy installation of the frame. The means by which the frame attaches to the truck bed rail is readily adaptable to different configurations of truck bed rails.

FIG. 15 is a detail view of the C-clamp that attaches the collapsible truck bed cover of the present invention to one side of the truck bed. This view shows all the same parts described in connection with FIG. 14. It also shows an additional optional nut 24, the purpose of which is to ensure that the plate 21 on the primary support bar 8 does not abut up against the C-clamp 17, which would cause undesired wear and tear on the C-Express clamp. Alternatively, the nut 24 could be integral to the C-clamp 17 and/or bolt 22. This figure also shows the torsion spring 18 that is positioned between the front and rear primary support bars 8 at their attachment point 11. The purpose of this torsion spring 18 is to bias the two primary support bars 8 so that they will fold up toward each other when the frame is collapsed (see FIG. 3).

FIG. 16 is a bottom view of the C-clamp of FIG. 15. The two nuts 23, 24 and plate 21 have been omitted for clarity. The bolt 22 is preferably welded to the C-clamp 17 along the length at which the bolt 22 overlaps with the underside of the C-clamp 17.

FIG. 17 is a detail view of one of the six torsion springs used in the collapsible truck bed cover of the present invention. Two of the torsion springs 18 are located at the swinging attachment points 11 (discussed above in connection with FIG. 15). The other four torsion springs 18 are located at the pivot points 10 between the primary 8 and secondary 9 support bars. The purpose of these torsion springs 18 is to bias the secondary support bars 9 so that they will fold toward the primary support bars 8 when the frame is collapsed.

As should be apparent from the foregoing discussion, as compared to other truck bed cover designs, the design of the present invention allows for quick and convenient installation, opening and stowing of the truck bed cover.

Furthermore, the overall design of the present invention provides much greater stability for the center of the top panel of the outer covering than the frame design of the Chandler patent because of the single, centrally located swinging pivot point and the longer primary support bars, which in turn allow for a much smaller angle (approximately forty-five (45) degrees) between the primary support bars 8 and the top of the truck bed (see angle A in FIG. 2). This smaller angle means that the secondary support bars 9 can be attached to the primary support bars 8 at an angle of approximately ninety (90) degrees (see angle B in FIG. 2) (because angle C must roughly equal angle C' in order for the frame to be balanced), as opposed to the acute angle of the Chandler design (see FIG. 5 of the Chandler patent). The greater angle between the primary and secondary support bars and the smaller angle between the primary support bars and the top of the truck bed allows the entire frame to be opened up so that the cross bars are spaced further apart. The fact that the cross bars are spaced further apart leaves less unsupported surface area on the top panel than in the Chandler design. These angle differences are all enabled by the centrally located pivot design of the frame.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A collapsible truck bed cover comprising:
(a) a frame; and
(b) an outer covering;
wherein the frame comprises four primary support bars, four secondary support bars, and four cross bars;
wherein two of the primary support bars and two of the secondary support bars are located on each side of the frame;
wherein the cross bars connect one side of the frame to the other;
wherein on each side of the frame, two of the primary support bars are pivotally connected to each other at one end of each primary support bar, and wherein this is the only point at which the primary support bars are connected to one another;
wherein the truck bed cover is installed on a truck bed, wherein the truck bed comprises side rails, and wherein the pivot point at which the two primary support bars are connected to each other is located inside and below the side rails;
wherein each primary support bar is connected to a cross bar at the end of the primary support bar that is not connected to the other primary support bar;
wherein each secondary support bar is connected to one of the primary support bars at one end of the secondary support bar, and wherein each secondary support bar is perpendicular to the primary support bar to which it is connected;
wherein the point at which each secondary support bars connects to a primary support bar is a pivot point;
wherein each secondary support bar is connected to a cross bar at the end of the secondary support bar that is not connected to a primary support bar;
wherein the secondary support bars are not connected to one another,
wherein two of the cross bars connect the four secondary support bars; and
wherein two of the cross bars connect the four primary support bars.

2. The collapsible truck bed cover of claim 1, further comprising a torsion spring at each of the four pivot points at which a secondary support bar connects to a primary support bar, wherein the torsion spring biases the secondary support bars toward the primary support bars to facilitate the collapsing of the frame.

3. The collapsible truck bed cover of claim 1, wherein the four primary support bars comprise two front primary support bars and two rear primary support bars, wherein the frame attaches to the truck bed by means of a stationary pivot point on either side of the truck bed, wherein the truck bed cover is installed on a truck bed, wherein the truck bed comprises side rails, and wherein the stationary pivot point is located inside the side rails and on the two rear primary support bars.

4. The collapsible truck bed cover of claim 3, wherein each stationary pivot point comprises a torsion spring that biases one of the rear primary support bars toward one of the front primary support bars to facilitate the collapsing of the frame.

5. The collapsible truck bed cover of claim 1, wherein the point at which the primary support bars are connected to one another is a swinging pivot point, such that when the frame is collapsed, the swinging pivot point moves toward the rear of the vehicle, and when the frame is opened, the swinging pivot point moves toward the front of the vehicle.

6. The collapsible truck bed cover of claim 5, wherein each swinging pivot point comprises a torsion spring that biases the primary support bars toward each other to facilitate the collapsing of the frame.

7. The collapsible truck bed cover of claim 1, wherein when the frame is in a full open position, the angle between each primary support bar and the top of the truck bed is approximately forty-five degrees.

8. The collapsible truck bed cover of claim 1, wherein the truck on which the cover is installed comprises a cab, wherein the cab comprises a rear face, wherein the four primary support bars comprise two front primary support bars and two rear primary support bars, wherein each front primary support bar comprises a top portion, and wherein the top portion of each of the two front primary support bars is curved so that when the frame is fully extended, the top portion of each front primary support bar is roughly longitudinally parallel to the rear face of the cab so as to facilitate folding of the truck bed cover underneath an existing tonneau cover.

9. The collapsible truck bed cover of claim 1, wherein the outer covering is comprised of a flexible material, and wherein the outer covering comprises one or more windows.

10. The collapsible truck bed cover of claim 9, wherein the windows are comprised of transparent vinyl.

11. The collapsible truck bed cover of claim 1, further comprising four straps, wherein the outer covering comprises a top panel, wherein the four cross bars comprise two front cross bars and two rear cross bars, wherein two of the straps connect the two front cross bars and two of the straps connect the two rear cross bars, and wherein the straps lie directly beneath the top panel of the outer covering.

12. The collapsible truck bed cover of claim 1, wherein the outer covering comprises a top panel, and wherein each of the four cross bars is inserted into a sleeve that is sewn onto the underside of the top panel.

13. The collapsible truck bed cover of claim 1, further comprising two straps, wherein the outer covering comprises a top panel, and wherein each strap is attached to the top panel at one end and removably attached to the rear end of the truck bed at the other end.

14. The collapsible truck bed cover of claim 1, further comprising two cords, wherein the outer covering comprises a rear panel, and wherein each cord is attached to the bottom end of the rear panel at one end and removably attached to the rear end of the truck bed at the other end.

15. The collapsible truck bed cover of claim 1, further comprising four zippers, wherein the outer covering comprises a top panel, two side panels, a front panel, and a rear panel, and wherein two of the zippers are situated between the front panel and one of the side panels, and wherein two of the zippers are situated between the rear panel and one of the side panels.

16. The collapsible truck bed cover of claim 1, wherein the outer covering comprises a rear panel, and wherein the rear panel comprises a tailgate cover piece.

17. The collapsible truck bed cover of claim 16, wherein the truck on which the cover is installed comprises a tailgate, and wherein the tailgate cover piece is contoured to fit the shape of the tailgate.

18. The collapsible truck bed cover of claim 1, wherein the truck bed cover is installed on a truck bed, wherein the truck bed comprises side rails, and wherein when the cover is fully collapsed, it fits completely underneath an existing tonneau cover pulled flat over the side rails.

19. The collapsible truck bed cover of claim 1, wherein the truck bed cover is installed on a truck bed, wherein the truck bed comprises side rails, and wherein the entire frame is located inside of the side rails but no part of the frame is located directly on top of the side rails.

* * * * *